（12） United States Patent
Kawase et al.

(10) Patent No.: US 8,397,700 B2
(45) Date of Patent: Mar. 19, 2013

(54) ABNORMALITY DIAGNOSIS DEVICE FOR EXHAUST GAS RECIRCULATION DEVICE

(75) Inventors: Kenichiro Kawase, Okazaki (JP);
Yousuke Hashimoto, Aichi-ken (JP);
Keisuke Yamashita, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 419 days.

(21) Appl. No.: 12/747,119

(22) PCT Filed: Dec. 11, 2008

(86) PCT No.: PCT/JP2008/072578
§ 371 (c)(1),
(2), (4) Date: Aug. 11, 2010

(87) PCT Pub. No.: WO2009/078344
PCT Pub. Date: Jun. 25, 2009

(65) Prior Publication Data
US 2010/0294253 A1 Nov. 25, 2010

(30) Foreign Application Priority Data
Dec. 14, 2007 (JP) .................................. 2007-323569

(51) Int. Cl.
*F02B 47/08* (2006.01)
*F02B 47/10* (2006.01)

(52) U.S. Cl. .................................. 123/568.16; 701/108

(58) Field of Classification Search ............. 123/568.16, 123/568.21, 568.22, 568.23, 568.24, 559.1, 123/316; 701/108; 60/605.1, 605.2, 598, 60/599, 602
See application file for complete search history.

(56) References Cited

U.S. PATENT DOCUMENTS

| 2002/0007821 | A1 | 1/2002 | Isobe et al. | |
|---|---|---|---|---|
| 2008/0202482 | A1 | 8/2008 | Furuta et al. | |
| 2008/0209887 | A1* | 9/2008 | Hanari et al. | 60/277 |
| 2008/0295514 | A1* | 12/2008 | Ono | 60/602 |

FOREIGN PATENT DOCUMENTS

| EP | 1 365 139 A2 | 11/2003 |
|---|---|---|
| JP | 59-215954 A | 12/1984 |
| JP | 04-140464 A | 5/1992 |
| JP | 06-058211 A | 3/1994 |

(Continued)

OTHER PUBLICATIONS

European Search Report dated Dec. 28, 2011, issued in corresponding European Patent Application No. 08862091.9.

(Continued)

*Primary Examiner* — Mahmoud Gimie
(74) *Attorney, Agent, or Firm* — Sughrue Mion, PLLC (57) ABSTRACT

An abnormality diagnosis device for an exhaust gas recirculation device in an internal combustion engine is provided. The exhaust gas recirculation device has an exhaust gas recirculation valve that adjusts the amount of recirculation exhausts gas returned from an exhaust passage to an intake passage of the engine. The abnormality diagnosis device includes a control section that changes the exhaust gas recirculation valve to diagnose an abnormality in the exhaust gas recirculation device. When the abnormality diagnosis execution condition is met, the control section, prior to the execution of the valve closing operation, inhibits the opening degree adjustment and executes a valve opening process to increase the opening degree of the valve from the opening degree at the time to a second target opening degree greater than the first target opening degree.

9 Claims, 5 Drawing Sheets

FOREIGN PATENT DOCUMENTS

| | | |
|---|---|---|
| JP | 06-229323 A | 8/1994 |
| JP | 06-288303 A | 10/1994 |
| JP | 07-180615 A | 7/1995 |
| JP | 09-144609 A | 6/1997 |
| JP | 2001-349231 A | 12/2001 |
| JP | 2003-343361 A | 12/2003 |

OTHER PUBLICATIONS

International Preliminary Report on Patentability for PCT/JP2008/072578 (4 pages), Dec. 29, 2011.

* cited by examiner

ABNORMALITY DIAGNOSIS DEVICE FOR EXHAUST GAS RECIRCULATION DEVICE

CROSS REFERENCE TO RELATED APPLICATIONS

This application is a National Stage of International Application No. PCT/JP2008/072578 filed Dec. 11, 2008, claiming priority based on Japanese Patent Application No. 2007-323569, filed Dec. 14, 2007, the contents of all of which are incorporated herein by reference in their entirety.

FIELD OF THE INVENTION

The present invention relates to an abnormality diagnosis device for an exhaust gas recirculation device in an internal combustion engine to adjust the exhaust gas recirculation amount through control of an exhaust gas recirculation valve.

BACKGROUND OF THE INVENTION

Conventionally, an example of an exhaust gas recirculation device for an internal combustion engine as described in Patent Document 1 has been known. An exhaust gas recirculation device as disclosed in Patent Document 1 changes the opening degree of an exhaust gas recirculation valve provided in an exhaust gas recirculation passage such that the recirculation amount of exhaust gas is appropriate for the operating state of the engine.

An abnormality can occur in the above described exhaust gas recirculation device due to a failure in the operation of the exhaust gas recirculation valve or clogging of the exhaust gas recirculation passage. When there is an abnormality in the exhaust gas recirculation device, the device cannot adjust the recirculation amount of exhaust gas to an amount appropriate for the engine operating state.

To diagnose whether there is an abnormality in an exhaust gas recirculation device, the following abnormality diagnosis may be executed. That is, when a condition for executing the abnormality diagnosis is met, the opening degree of the exhaust gas recirculation valve is forcibly changed to the design minimum opening degree, and changes in a state quantity related to intake due to changes in the opening degree of the exhaust gas recirculation valve, for example, the amount of change in the intake pressure is monitored. When the amount of change in the intake state quantity is less than a predetermined determination value, it is determined that there is an abnormality in the exhaust gas recirculation device. That is, this method for diagnosing abnormalities takes advantage of the fact that the intake state quantity changes under the influence of changes in the exhaust gas recirculation amount. When there is an abnormality in the exhaust gas recirculation device, the amount of change in the actual exhaust gas recirculation amount does not correspond to the opening degree of the exhaust gas recirculation valve, and therefore, the amount of change in the intake state quantity does not correspond to changes in the opening degree of the exhaust gas recirculation valve. Therefore, if the amount of change in the intake state quantity is less than the predetermined determination value when the opening degree of the exhaust gas recirculation valve is changed to the minimum opening degree, it is determined that there is an abnormality in the exhaust gas recirculation device.

Another type of known exhaust gas recirculation device executes adjustment (opening degree adjustment) for reducing the opening degree of an exhaust gas recirculation valve when the density of intake air is low. For example, the device reduces the opening degree of the valve when the vehicle is at a high altitude compared to a case where the vehicle is at a low altitude. The execution of the abnormality diagnosis in such an exhaust gas recirculation device might bring about the following drawbacks.

That is, when the adjustment of the opening degree of the exhaust gas recirculation valve is being executed, the opening degree of the exhaust gas recirculation valve at the start of the abnormality diagnosis is maintained at a relatively small value. Therefore, even if the opening degree of the exhaust gas recirculation valve is forcibly changed from the opening degree at the start of the abnormality diagnosis to the minimum opening degree, the amount of accompanying change in the intake state quantity is small. Therefore, even if there is no abnormality in the exhaust gas recirculation device, the amount of change in the intake state quantity falls below the determination value of the abnormality diagnosis. This might lead to a false determination of an abnormality in the exhaust gas recirculation device.

So far, disadvantages of the abnormality diagnoses executed during the opening degree adjustment of the exhaust gas recirculation valve have been discussed. However, such disadvantages are present not only in the above described condition, but also in a case where the opening degree of the exhaust gas recirculation valve is set to a small value while the density of the intake air is high, for example, when the vehicle is at a low altitude.

Patent Document 1: Japanese Laid-Open Patent Publication No. 6-288303

DISCLOSURE OF THE INVENTION

Accordingly, it is an objective of the present invention to provide an abnormality diagnosis device that is capable of accurately determining whether there is an abnormality in an exhaust gas recirculation device regardless of the opening degree of an exhaust gas recirculation valve at the start of the diagnosis.

To achieve the above objectives, and in accordance with a first aspect of the present invention, an abnormality diagnosis device for an exhaust gas recirculation device in an internal combustion engine is provided. The exhaust gas recirculation device has an exhaust gas recirculation valve that adjusts the amount of recirculation exhausts gas returned from an exhaust passage to an intake passage of the engine. The exhaust gas recirculation device executes an opening degree adjustment to reduce a target opening degree of the exhaust gas recirculation valve as the density of intake air is lowered. The abnormality diagnosis device includes a control section that changes the exhaust gas recirculation valve to diagnose an abnormality in the exhaust gas recirculation device. When an abnormality diagnosis execution condition is met, the control section executes a valve closing operation to reduce the opening degree of the valve to a first target opening degree and monitors the degree of change of a state quantity of intake that changes under the influence of a change in exhaust gas recirculation amount caused by the execution of the valve closing operation. When the degree of change is less than a determination value, the control section determines that there is an abnormality in the exhaust gas recirculation device. When the abnormality diagnosis execution condition is met, the control section, prior to the execution of the valve closing operation, inhibits the opening degree adjustment and executes a valve opening process to increase the opening degree of the valve from the opening degree at the time to a second target opening degree greater than the first target opening degree.

In accordance with a second aspect of the present invention, an abnormality diagnosis device for an exhaust gas recirculation device in an internal combustion engine is provided. The exhaust gas recirculation device has an exhaust gas recirculation valve that adjusts the amount of recirculation exhausts gas returned from an exhaust passage to an intake passage of the engine. The abnormality diagnosis device includes a control section that changes the exhaust gas recirculation valve to diagnose an abnormality in the exhaust gas recirculation device. When an abnormality diagnosis execution condition is met, the control section executes a valve closing operation to reduce the opening degree of the valve to a first target opening degree and monitors the degree of change of a state quantity of intake that changes under the influence of a change in exhaust gas recirculation amount caused by the execution of the valve closing operation. When the degree of change is less than a determination value, the control section determines that there is an abnormality in the exhaust gas recirculation device. When the abnormality diagnosis execution condition is met, the control section, prior to the execution of the valve closing operation, executes a valve opening process to increase the opening degree of the valve from the opening degree at the time to a second target opening degree greater than the first target opening degree regardless of the opening degree of the valve at the time when the execution condition is met.

In accordance with a third aspect of the present invention, an abnormality diagnosis device for an exhaust gas recirculation device in an internal combustion engine is provided. The exhaust gas recirculation device has an exhaust gas recirculation valve that adjusts the amount of recirculation exhausts gas returned from an exhaust passage to an intake passage of the engine. The abnormality diagnosis device includes a control section that changes the exhaust gas recirculation valve to diagnose an abnormality in the exhaust gas recirculation device. When an abnormality diagnosis execution condition is met, the control section executes a valve opening process to increase the opening degree of the valve from the opening degree at the time to a second target opening degree. Thereafter, the control section executes a valve closing operation to reduce the opening degree of the valve to a first target opening degree smaller than the second target opening degree and monitors the degree of change of a state quantity of intake that changes under the influence of a change in exhaust gas recirculation amount caused by the execution of the valve closing operation. When the degree of change is less than a determination value, the control section determines that there is an abnormality in the exhaust gas recirculation device. The control section sets the second target opening degree based on the density of intake air.

DETAILED DESCRIPTION OF THE PREFERRED EMBODIMENTS

A first embodiment of the present invention will now be described with reference to FIGS. 1 to 3. An abnormality diagnosis device for an exhaust gas recirculation device 70 according to the present invention is used for a diesel engine 1 mounted on a vehicle.

Figure 1:
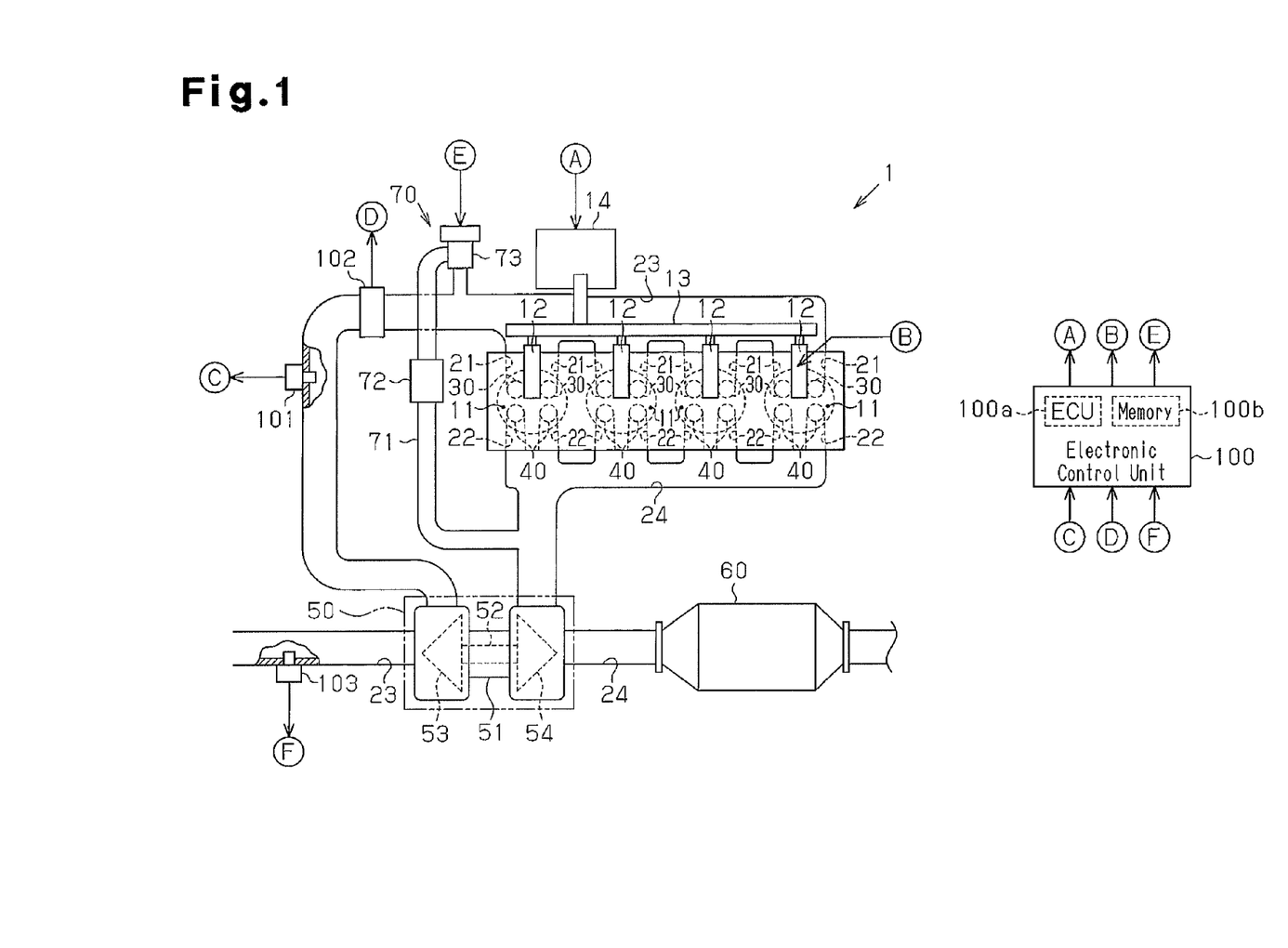
FIG. 1 is a diagram illustrating the entirety of an abnormality diagnosis device for an exhaust gas recirculation device according to a first embodiment of the present embodiment.

As shown in FIG. 1, the diesel engine 1 includes a cylinder block, a cylinder head, and a plurality of combustion chambers 11 defined by pistons. The diesel engine 1 also includes a plurality of injectors 12 for injecting fuel. Each injector 12 corresponds to one of the combustion chambers. The injectors 12 are connected to a common rail 13, which serves as a fuel distribution pipe. The common rail 13 distributes high-pressure fuel supplied by a high pressure pump 14 to the injectors 12. In the present embodiment, the numbers of the combustion chambers 11 and the injectors 12 are four each.

The displacement of the high pressure pump 14 and the fuel injection amount of the injectors 12 are controlled by an electronic control unit 100, which serves as a control section controlling the diesel engine 1 in an overall fashion. The electronic control unit 100 includes a microcomputer, which includes a central processing unit 100a and a memory 100b. The central processing unit 100a performs numerical calculation and information processing according to control programs for executing various types of control. The control programs are stored in the memory 100b. The memory 100b stores the control programs and various function maps necessary for executing the control programs.

The diesel engine 1 includes intake ports 21 and exhaust ports 22 connected to the combustion chambers 11. The intake ports 21 are connected to an intake passage 23. The intake ports 21 are selectively connected to and disconnected from the combustion chambers 11 by intake valves 30. The exhaust ports 22 are connected to an exhaust passage 24. The exhaust ports 22 are selectively connected to and disconnected from the combustion chambers 11 by exhaust valves 40. That is, during the intake stroke of the diesel engine 1, the intake valve 30 is opened, so that air is drawn into the combustion chambers 11 through the intake passage 23 and the intake ports 21. During the exhaust stroke of the diesel engine 1, the exhaust valves 40 are open so that burned gas in the combustion chambers 11 is exhausted to the outside via the exhaust ports 22 and the exhaust passage 24.

The intake passage 23 and the exhaust passage 24 are connected to a supercharger 50, which increases the pressure of intake air in the intake passage 23 using the energy of the exhaust gas flowing through the exhaust passage 24. The supercharger 50 includes a housing 51, which is arranged over both of the intake passage 23 and the exhaust passage 24. A shaft 52 is rotatably supported by the housing 51. A compressor wheel 53 is provided at one end of the shaft 52 to be exposed in the intake passage 23, and a turbine wheel 54 is provided at the other end of the shaft 52 to be exposed in the exhaust passage 24. The compressor wheel 53 and the turbine wheel 54 are caused to rotate integrally by means of the shaft 52. Exhaust gas flowing through the exhaust passage 24 is directed onto the turbine wheel 54, so that the turbine wheel 54 rotates. The rotational force of the turbine wheel 54 is transferred to the compressor wheel 53 via the shaft 52. Rotation of the compressor wheel 53 increases the pressure of the air in the intake passage 23. This increases the mass flow rate of the air drawn into the combustion chambers 11, thereby enhancing the power of the internal combustion engine.

A supercharging pressure sensor 101 and an air amount sensor 102 are provided in the intake passage 23 at positions downstream of the compressor wheel 53. The supercharging pressure sensor 101 detects the pressure of intake air in the intake passage 23 (hereinafter, referred to as supercharging pressure), and the air amount sensor 102 detects the intake air amount. An intake pressure sensor 103 is provided in the intake passage 23 at a position upstream of the compressor wheel 53. The intake pressure sensor 103 detects the pressure of the intake air. Detection signals of the supercharging pressure sensor 101, the air amount sensor 102, and the intake pressure sensor 103 are sent to the electronic control unit 100.

A catalytic converter 60 is provided in the exhaust passage 24 at a position downstream of the turbine wheel 54. The catalytic converter 60 includes an oxidation catalyst and a filter. The oxidation catalyst oxidizes hydrocarbon and carbon monoxide in the exhaust gas. The filter is made of a porous material and traps particulate matter, which is predominantly composed of soot in exhaust gas.

In addition to the above components, the diesel engine 1 includes an exhaust gas recirculation device 70, which recirculates exhaust gas from the exhaust passage 24 to the intake passage 23. The exhaust gas recirculation device 70 includes an exhaust gas recirculation passage 71, a recirculation exhaust gas cooler 72 provided in the exhaust gas recirculation passage 71, and the exhaust gas recirculation valve 73. The exhaust gas recirculation passage 71 connects a section of the exhaust passage 24 that is upstream of the turbine wheel 54 and a section of the intake passage 23 that is downstream of the air amount sensor 102. The recirculation exhaust gas cooler 72 cools exhaust gas flowing through the exhaust gas recirculation passage 71. The exhaust gas recirculation valve 73 adjusts the flow rate of exhaust gas through the exhaust gas recirculation passage 71, that is, an exhaust gas recirculation amount.

The electronic control unit 100 controls the exhaust gas recirculation device 70 basically in the following manner.

To change the flow rate of exhaust gas from the exhaust passage 24 to the intake passage 23, that is, the exhaust gas recirculation amount, to an amount that corresponds to the engine operating state, the electronic control unit 100 sets a target opening degree of the exhaust gas recirculation valve 73 based on the engine operating state, and controls the exhaust gas recirculation valve 73 such that its actual opening degree becomes equal to the target opening degree. For example, during a middle load operation, the electronic control unit 100 increases the target opening degree of the exhaust gas recirculation valve 73 so that the exhaust gas recirculation amount is increased, thereby increasing the actual opening degree of the exhaust gas recirculation valve 73 to the target opening degree. This lowers the combustion temperature and thus lowers the emission of nitrogen oxide. During a low load operation, the electronic control unit 100 decreases the target opening degree of the exhaust gas recirculation valve 73 so that the exhaust gas recirculation amount is reduced, thereby decreasing the actual opening degree of the exhaust gas recirculation valve 73 to the target opening degree. This stabilizes the combustion state of the diesel engine 1 and thus improves the fuel efficiency.

When it is determined that the diesel engine 1 is in a low intake air density condition, such as at a high altitude, based on an output signal of the intake pressure sensor 103, an adjustment for decreasing the opening degree of the exhaust gas recirculation valve 73 is executed to inhibit deterioration of the combustion state of the electronic control unit 100 (hereinafter, referred to as opening degree adjustment).

An abnormality can occur in the exhaust gas recirculation device 70 due to a failure in the operation of the exhaust gas recirculation valve 73 or clogging of the exhaust gas recirculation passage 71. When there is an abnormality in the exhaust gas recirculation device 70, it is difficult to control the exhaust gas recirculation amount to an appropriate amount that suitable for the engine operating state.

Accordingly, in the present embodiment, whether there is an abnormality in the exhaust gas recirculation device 70 is diagnosed.

That is, when a condition for executing the abnormality diagnosis is met, the opening degree of the exhaust gas recirculation valve 73 is forcibly changed from the current opening degree (uncontrolled opening degree) to the design minimum opening degree, and changes in the state quantity related to intake due to changes in the opening degree of the exhaust gas recirculation valve 73 is monitored. When the amount of change in the intake state quantity is less than a predetermined determination value, the electronic control unit 100 determines that there is an abnormality in the exhaust gas recirculation device 70. The method for diagnosing the exhaust gas recirculation device 70 takes advantage of the fact that the intake state quantity changes under the influence of the exhaust gas recirculation amount. That is, when there is an abnormality in the exhaust gas recirculation device 70, the amount of change in the actual recirculation gas amount does not correspond to the opening degree of the exhaust gas recirculation valve 73 even if the opening degree of the exhaust gas recirculation valve 73 is minimized. Also, the amount of change in the intake state quantity does not correspond to the amount of change in the opening degree of the exhaust gas recirculation valve 73. Based on the occurrence of such condition, it is determined that there is an abnormality in the exhaust gas recirculation device 70. The abnormality diagnosing method described above is referred to a basic diagnosing method.

However, while the opening degree adjustment of the exhaust gas recirculation valve 73 is being executed, the opening degree of the exhaust gas recirculation valve 73 at the start of the abnormality diagnosis (the uncontrolled opening degree) is maintained at a relatively small value by the opening degree adjustment. Therefore, even if the opening degree of the exhaust gas recirculation valve 73 is forcibly changed from the uncontrolled opening degree to the minimum opening degree, the amount of accompanying change in the intake state quantity is small. Therefore, even if there is no abnormality in the exhaust gas recirculation device 70, the amount of change in the intake state quantity falls below the determination value of the abnormality diagnosis. This leads to a false determination of an abnormality in the exhaust gas recirculation device 70.

Accordingly, in the present embodiment, a false diagnosis due to a small opening degree of the exhaust gas recirculation valve 73 at the start of the diagnosis is adequately inhibited by the above described basic diagnosing method, in which the opening degree of the exhaust gas recirculation valve 73 is changed from an uncontrolled opening degree to the minimum opening degree, and an abnormality diagnosing method described below.

Hereinafter, a detailed routine for diagnosing an abnormality according to the present embodiment will be described with reference to the flowchart of FIG. 2. A series of processes shown in FIG. 2 is repeatedly executed by the microcomputer incorporated in the electronic control unit 100. That is, the abnormality diagnosing process of the present embodiment is executed from the initial step when a predetermined time has elapsed after a series of processes is complete, that is, after the process reaches the step labeled END in FIG. 2.

In step S10, it is determined whether fuel cut-off operation of the diesel engine 1 is being executed. If it is determined that the fuel cut-off operation is not being executed at step S10 (NO at step S10), the execution of the determination process of step S10 is suspended until a predetermined standby time (for example, 10 seconds) elapses. When the standby time has elapsed, the determination process of step 10 is executed again.

On the other hand, if it is determined that the fuel cut-off operation is being executed (YES at step S10), it is then determined whether an opening degree adjustment flag Fk is ON (step S20). The opening degree adjustment flag Fk is used to indicate whether the opening degree adjustment for inhibiting deterioration of the combustion state due to a lowered density of the intake air is being executed. When the opening degree adjustment is started, the opening degree adjustment flag Fk is set to ON. When the opening degree adjustment is finished, the opening degree adjustment flag Fk is set to OFF.

When the opening degree adjustment flag Fk is ON (YES at step S20), the currently executed opening degree adjustment is temporarily inhibited until the current abnormality diagnosis is complete (step S30). In the subsequent step 40, the opening degree of the exhaust gas recirculation valve 73 is increased from the opening degree at the time, or an uncontrolled opening degree D0, to a second target opening degree DL. This process will hereinafter be referred to as a valve opening process. The second target opening degree DL is previously set to a maximum opening degree Dmax in the variation range of the opening degree of the exhaust gas recirculation valve 73, and is stored in the memory 100b of the electronic control unit 100.

In the subsequent step 50, the opening degree of the exhaust gas recirculation valve 73 is reduced from the current opening degree, or the maximum opening degree Dmax, to a first target opening degree DS. This process will hereinafter be referred to as a valve closing process. After the valve closing process is complete, an amount of change ΔQ of the intake air amount due to the decrease in the opening degree of the exhaust gas recirculation valve 73 in the valve closing process of step 50 is detected based on an output signal of the air amount sensor 102 (step S60). The first target opening degree DS is previously set to a minimum opening degree Dmin in the variation range of the opening degree of the exhaust gas recirculation valve 73, and is stored in the memory 100b.

Next, it is determined whether the detected amount of change ΔQ of the intake air amount is greater than a determination value ΔQL (step S70). If the amount of change ΔQ is less than or equal to the determination value ΔQL (NO at step S70), it is determined that there is an abnormality in the exhaust gas recirculation device 70. In this case, a warning lamp provided, for example, in a vehicle control panel is turned on (step S90), and the series of processes is temporarily terminated. On the other hand, when the amount of change ΔQ is greater than the determination value ΔQL (YES at step S70), it is determined that there is no abnormality in the exhaust gas recirculation device 70 (step S80), and the series of processes is temporarily terminated.

On the other hand, if the opening degree adjustment flag Fk is determined to be OFF at step S20 (NO at step S20), the above described diagnosing method is executed. That is, the series of processes moves from step 20 to step S50, and a process is performed in which the opening degree of the exhaust gas recirculation valve 73 is decreased from the opening degree at the time, that is, the uncontrolled opening degree to the minimum opening degree Dmin. After this process is complete, the amount of change ΔQ of the intake air amount due to the reduction in the opening degree of the exhaust gas recirculation valve 73 is detected (step S60), and the process of steps S70 to S90 is executed.

Figure 3:
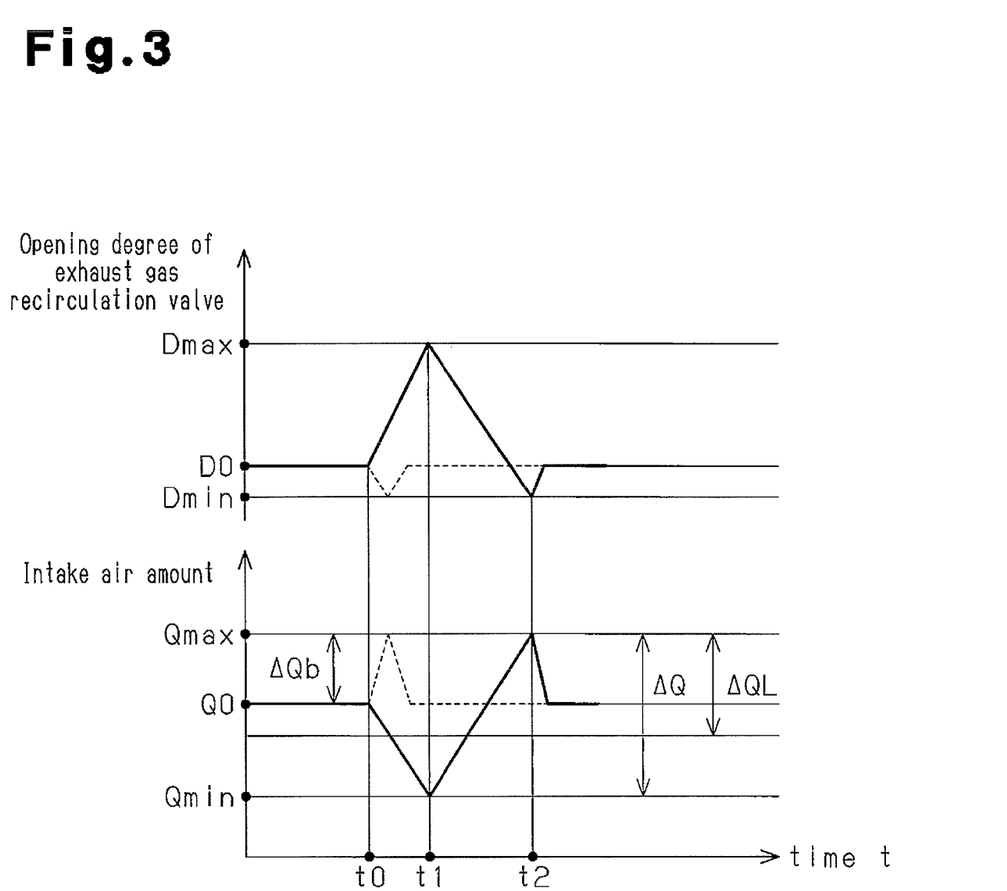
FIG. 3 is a timing chart showing changes over time in the opening degree of the exhaust gas recirculation valve and the intake air amount in the abnormality diagnosis executed by the abnormality diagnosis device shown in FIG. 1.

Referring to FIG. 3, one example of the abnormality diagnosing method will be described. FIG. 3 is a timing chart showing changes over time in the opening degree of the exhaust gas recirculation valve 73 and the intake air amount, which changes accompany the execution of the above described abnormality diagnosis.

After the abnormality diagnosing process is started, it is determined that the fuel cut-off operation is being executed at time t0 (YES at step S10). In this case, it is determined that the opening degree adjustment is being executed (YES at step S20). Also, the opening degree adjustment is temporarily inhibited (step S30). Then, the opening valve process is executed, so that the opening degree of the exhaust gas recirculation valve 73 is increased from the uncontrolled opening degree D0 to the maximum opening degree Dmax (step S40).

During the period from time t0 to time t1, at which the opening degree of the exhaust gas recirculation valve 73 becomes the maximum opening degree Dmax, the exhaust gas recirculation amount increases as the opening degree of the exhaust gas recirculation valve 73 is increased. Under the influence of the change in the exhaust gas recirculation amount, the intake air amount starts decreasing from the intake air amount Q0 at time to.

Thereafter, the valve closing process is executed so that the opening degree of the exhaust gas recirculation valve 73 is reduced from the maximum opening degree Dmax to the minimum opening degree Dmin (step S50).

During the period from time t1 to time t2, at which the opening degree of the exhaust gas recirculation valve 73 becomes the minimum opening degree Dmin, the exhaust gas recirculation amount decreases as the opening degree of the exhaust gas recirculation valve 73 is decreased. Under the influence of the change in the exhaust gas recirculation amount, the intake air amount starts increasing from the intake air amount Q1 at time t1.

At time t2, the amount of change ΔQ of the intake air amount due to the decrease in the opening degree of the exhaust gas recirculation valve 73, that is, the difference between the intake air amount Qmin at time t1 and the intake air amount Qmax at time t2 is detected (step S60). When the amount of change ΔQ of the detected intake air amount is greater than the determination value ΔQL (YES at step S70), it is determined that there is no abnormality in the exhaust gas recirculation device 70 (step S80). After the abnormality diagnosis is finished, the opening degree adjustment, which has been temporarily inhibited, is resumed.

In the basic diagnosing method, the valve closing process is executed without the valve opening process of step S40. Thus, as shown by broken lines in FIG. 3, the amount of change ΔQb of the intake air amount due to decrease in the opening degree of the exhaust gas recirculation valve 73, that is, the difference ΔQb between the intake air amount Q0 at time t0 and the intake air amount Qmax at the time when the opening degree of the exhaust gas recirculation valve 73 becomes the minimum opening degree Dmin becomes smaller than the amount of change ΔQ. In this case, the amount of change in the intake air amount falls below the determination value ΔQL even though there is no abnormality in the exhaust gas recirculation device 70. Thus, a false diagnosis is made due to a small value of the uncontrolled opening degree D0.

The first embodiment described above has the following advantages.

(1) When the opening degree adjustment flag Fk is ON, that is, when it is determined that the opening degree adjustment is being executed, the opening degree adjustment by the exhaust gas recirculation device 70 is inhibited and the opening degree of the exhaust gas recirculation valve 73 is increased to the second target opening degree DL, which is the maximum opening degree Dmax in the variation range of the opening degree of the exhaust gas recirculation valve 73. Therefore, even if the opening degree adjustment is being executed when there is no abnormality in the exhaust gas recirculation device 70, the amount of change ΔQ of the intake air amount, which changes under the influence of changes in the exhaust gas recirculation amount due to decrease in the opening degree of the exhaust gas recirculation valve 73, is sufficiently great. That is, as long as there is no abnormality in the exhaust gas recirculation device 70, the amount of change ΔQ of the intake air amount due to reduction in the opening degree of the exhaust gas recirculation valve 73 has a value required for appropriately determining whether there is an abnormality in the exhaust gas recirculation device 70 regardless of whether the density of the intake air is high or low. Therefore, when determining that there is an abnormality in the exhaust gas recirculation device 70 based on the fact that the amount of change ΔQ of the intake air amount is smaller than the determination value ΔQL, the result of the abnormality diagnosis is prevented from being incorrect due to a small opening degree of the exhaust gas recirculation valve at the start of the diagnosis, that is, a small value of the uncontrolled opening degree D0.

(2) Since the second target opening degree DL and the first target opening degree DS are set to such values that there is a sufficient difference therebetween, the degree of change in the intake state quantity accompanying the valve closing process is sufficiently large regardless of whether the density of the intake air is high or low, as long as there is no abnormality in the exhaust gas recirculation device 70. Thus, the result of the abnormality diagnosis is reliably prevented from being incorrect due to a small opening degree of the exhaust gas recirculation valve 73 at the start of the diagnosis.

(3) The minimum opening degree Dmin in the variation range of the opening degree of the exhaust gas recirculation valve 73 is set to the first target opening degree DS, and the maximum opening degree Dmax in the variation range of the opening degree of the exhaust gas recirculation valve 73 is set to the second target opening degree DL. This maximizes the amount of change ΔQ of the intake air amount, which is changed under the influence of a change in the exhaust gas recirculation amount due to decrease in the opening degree of the exhaust gas recirculation valve 73. Thus, the result of the abnormality diagnosis is reliably prevented from being incorrect due to a small value of the uncontrolled opening degree D0.

(4) The abnormality diagnosis according to the present embodiment is executed on the condition that the fuel cut-off operation is being executed. Therefore, during the abnormality diagnosis, the combustion state of the diesel engine 1 is prevented from being influenced by changes in the opening degree of the exhaust gas recirculation valve 73.

A second embodiment of the present invention will now be described with reference to FIG. 4. The differences from the first embodiment will be mainly discussed.

In the first embodiment, the valve opening process is executed only when the opening degree adjustment of the exhaust gas recirculation valve 73 is being executed, and the valve closing process is executed afterwards. When the opening degree adjustment of the exhaust gas recirculation valve 73 is not being executed, the basic diagnosing method is executed. Accordingly, when the abnormality diagnosis is executed during the opening degree adjustment, it is possible to reliably prevent a false diagnosis due to a small opening degree of the exhaust gas recirculation valve 73 at the start of the diagnosis.

Not only when the abnormality diagnosis is executed during the opening degree adjustment, but also, when the opening degree of the exhaust gas recirculation valve 73 is set to a small value through a process other than the opening degree adjustment, a false diagnosis may be made due to the fact that the opening degree of the exhaust gas recirculation valve 73 is small.

Figure 2:
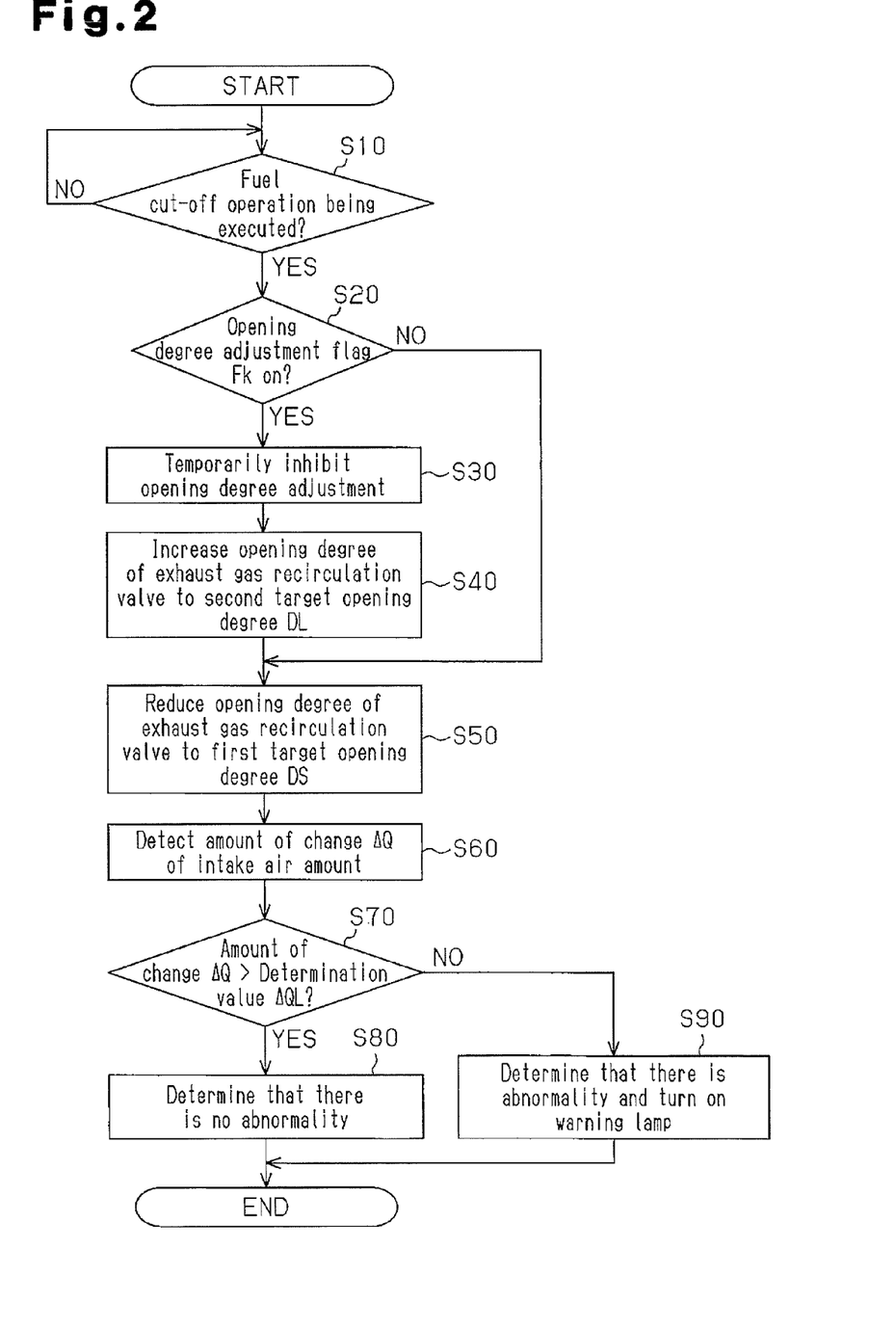
FIG. 2 is a flowchart showing a procedure of an abnormality diagnosis by the abnormality diagnosis device shown in FIG. 1.

Accordingly, in the present embodiment, the abnormality diagnosing process of the first embodiment shown in FIG. 2 is replaced by an abnormality diagnosing process described below, so that a false diagnosis is reliably inhibited when the opening degree of the exhaust gas recirculation valve 73 is set to a small value through a process other than the opening degree adjustment. That is, in the present embodiment, when the condition for executing the abnormality diagnosis is met, the valve opening process is executed regardless of the opening degree of the exhaust gas recirculation valve 73 at the time when the condition is met. Afterwards, the valve closing process is executed.

Figure 4:
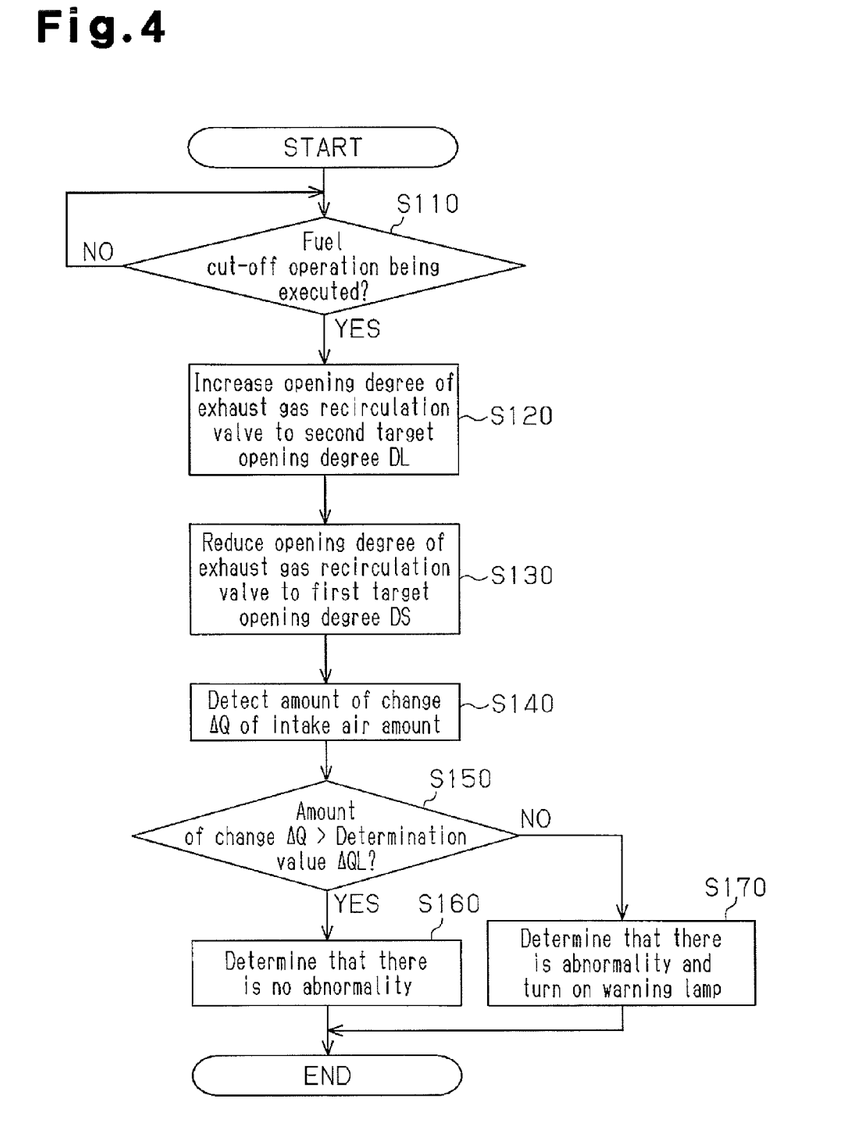
FIG. 4 is a flowchart showing a procedure of an abnormality diagnosis executed by an abnormality diagnosis device for an exhaust gas recirculation device according to a second embodiment of the present embodiment.

In this procedure, it is first determined whether fuel cut-off operation of the diesel engine 1 is being executed (step S110) as shown in FIG. 4. If it is determined that the fuel cut-off operation is not being executed (NO at step S110), the execution of the determination process of step S110 is suspended until a predetermined standby time (for example, 110 seconds) elapses. When the standby time has elapsed, the determination process of step 110 is executed again.

If it is determined that the fuel cut-off operation is being executed (YES at step S110), the valve opening process is executed, and the opening degree of the exhaust gas recirculation valve 73 is increased from the opening degree at the time, or the uncontrolled opening degree D0, to the second target opening degree DL. The second target opening degree DL is previously set to a maximum opening degree Dmax in the variation range of the opening degree of the exhaust gas recirculation valve 73, and is stored in the memory 100*b* of the electronic control unit 100.

Next, the valve closing process is executed so that the opening degree of the exhaust gas recirculation valve 73 is reduced from the current opening degree, or the second target opening degree DL, to the first target opening degree DS (step S130). After the valve closing process is complete, an amount of change ΔQ of the intake air amount due to the decrease in the opening degree of the exhaust gas recirculation valve 73 in the valve closing process of step S130 is detected based on an output signal of the air amount sensor 102 (step S140). The first target opening degree DS is previously set to a minimum opening degree Dmin in the variation range of the opening degree of the exhaust gas recirculation valve 73, and is stored in the memory 100*b*.

Next, it is determined whether the detected amount of change ΔQ of the intake air amount is greater than a determination value ΔQL (step S150). If the amount of change ΔQ is less than or equal to the determination value ΔQL (NO at step S150), it is determined that there is an abnormality in the exhaust gas recirculation device 70. In this case, a warning lamp provided, for example, in a vehicle control panel is turned on (step S170), and the series of processes is temporarily terminated. On the other hand, when the amount of change ΔQ is greater than the determination value ΔQL (YES at step S70), it is determined that there is no abnormality in the exhaust gas recirculation device 70 (step S160), and the series of processes is temporarily terminated.

In addition to the advantages (1) to (4) of the first embodiment, the second embodiment has the following advantages.

(5) The valve opening process is not only executed when the abnormality determination is executed during the execution of the opening degree adjustment, but also always executed in the abnormality diagnosis. Therefore, when the opening degree of the exhaust gas recirculation valve 73 has been set to a small value, for example, through a process other than the opening degree adjustment, the result of the abnormality diagnosis is prevented from being incorrect due to the small opening degree of the exhaust gas recirculation valve 73.

A third embodiment of the present invention will now be described with reference to FIG. 5. The differences from the second embodiment will be mainly discussed.

When the diesel engine 1 is operated in a low air density condition, the ratio of recirculation exhaust gas in the gas prior to combustion in the combustion chambers 11 tends to increase. Therefore, if the opening degree of the exhaust gas recirculation valve 73 is increased to the maximum opening degree Dmax during the execution of the abnormality diagnosis as in the first or second embodiment, a low density of the intake air increases the ratio of recirculation exhaust gas in the gas prior to combustion in the combustion chambers 11. This can deteriorate the engine operating state, causing, for example, misfires. That is, when the actual opening degree of the exhaust gas recirculation valve 73 is made excessively large in relation to the density of the intake air by the valve opening process of the abnormality diagnosis, the engine operating state will be deteriorated.

In the third embodiment, the abnormality diagnosing process (FIG. 2 or 4) is replaced by an abnormality diagnosing process described below to inhibit the engine operating state from being deteriorating.

Figure 5:
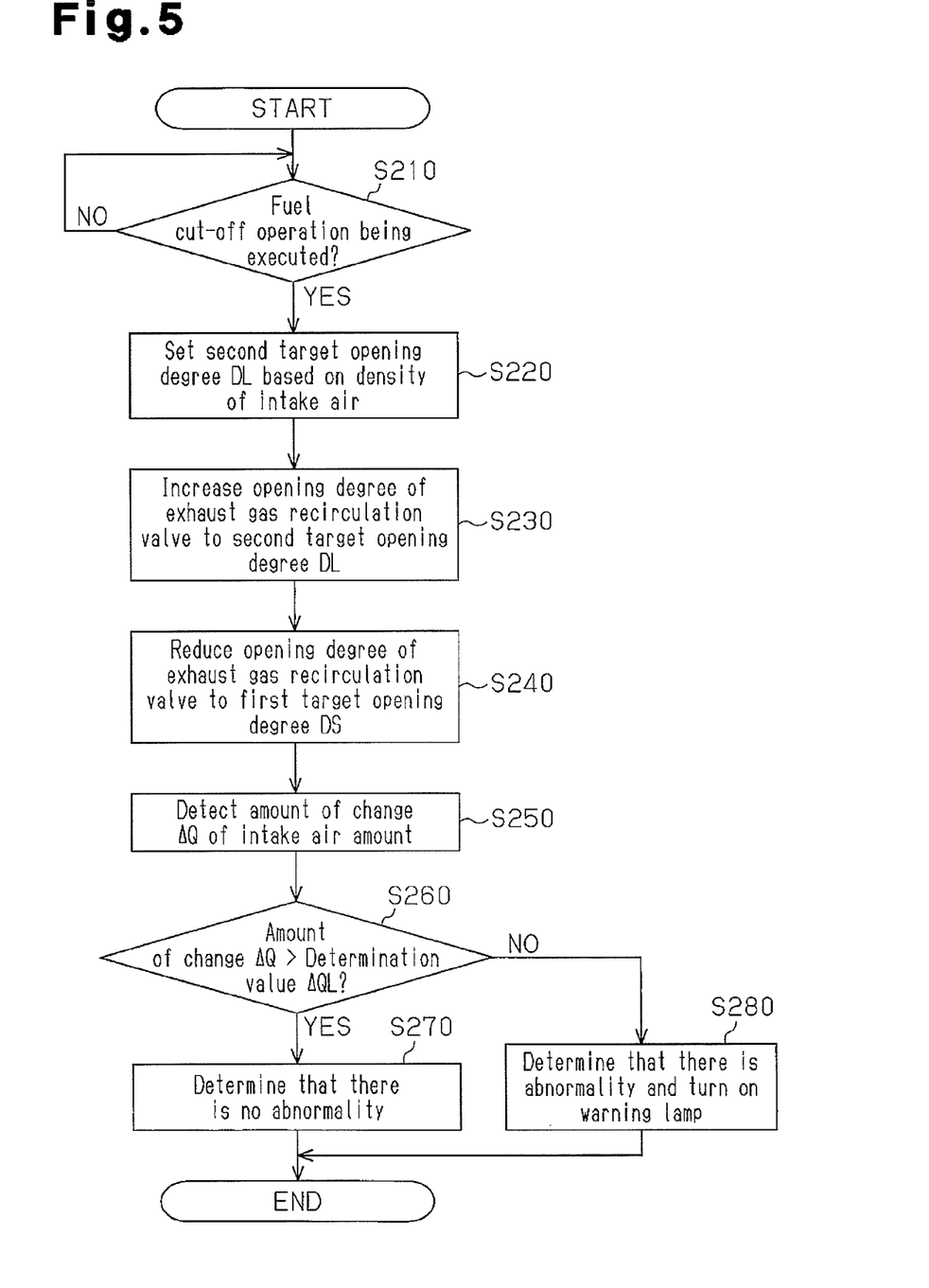
FIG. 5 is a flowchart showing a procedure of an abnormality diagnosis by an abnormality diagnosis device for an exhaust gas recirculation device according to a third embodiment of the present embodiment.

It is first determined whether fuel cut-off operation of the diesel engine 1 is being executed (step S110) as shown in FIG. 5. If it is determined that the fuel cut-off operation is not being executed (NO at step S110), the execution of the determination process of step S110 is suspended until a predetermined standby time (for example, 110 seconds) elapses. When the standby time has elapsed, the determination process of step 110 is executed again.

On the other hand, if it is determined that the fuel cut-off operation is being executed (YES at step S210), the density of the intake air is estimated based on an output signal of the intake pressure sensor 103. Based on the estimated density, the second target opening degree DL is set by referring to a computation map (step S220). The computation map is stored in the memory 100b in advance. When provided with the density of the intake air, the computation map returns a value that has been adapted to the density. That is, the computation map returns the maximum opening degree of the exhaust gas recirculation valve 73 in a range where an increase in the opening degree of the exhaust gas recirculation valve 73 does not cause the engine to operate in an abnormal manner. In the computation map, the smaller the density of the intake air amount, the smaller the second target opening degree is set to be.

Then, the valve opening process is executed, and the opening degree of the exhaust recirculation valve 73 is increased from the opening degree at the time, or an uncontrolled opening degree D0, to a second target opening degree DL (step S230).

Next, the valve closing process is executed so that the opening degree of the exhaust gas recirculation valve 73 is reduced from the current opening degree, or the second target opening degree DL, to the first target opening degree DS (step S240). After the valve closing process is complete, an amount of change ΔQ of the intake air amount due to the decrease in the opening degree of the exhaust gas recirculation valve 73 in the valve closing process of step 50 is detected based on an output signal of the air amount sensor 102 (step S250). The first target opening degree DS is previously set to a minimum opening degree Dmin in the variation range of the opening degree of the exhaust gas recirculation valve 73, and is stored in the memory 100b.

Next, it is determined whether the detected amount of change ΔQ of the intake air amount is greater than a determination value ΔQL (step S260). If the amount of change ΔQ is less than or equal to the determination value ΔQL (NO at step S260), it is determined that there is an abnormality in the exhaust gas recirculation device 70. In this case, a warning lamp provided, for example, in a vehicle control panel is turned on (step S280), and the series of processes is temporarily terminated. On the other hand, when the amount of change ΔQ is greater than the determination value ΔQL (YES at step S260), it is determined that there is no abnormality in the exhaust gas recirculation device 260 (step S270), and the series of processes is temporarily terminated.

In addition to the advantages (1) to (5) of the previous embodiments, the third embodiment has the following advantages.

(6) The smaller the density of the intake air amount, the smaller the second target opening degree is set to be. This reliably prevents the result of the abnormality diagnosis from being incorrect due to a small opening degree of the exhaust gas recirculation valve 73, while preventing the engine operating state from being deteriorated by an increase in the opening degree of the exhaust gas recirculation valve 73.

The above described embodiments may be modified as follows.

In the first embodiment, the second target opening degree DL is maintained at a constant value in the valve opening process (step S40). However, as in the third embodiment, the second target opening degree DL may be set based on the density of the intake air. This configuration reliably prevents the result of the abnormality diagnosis from being incorrect due to a small opening degree of the exhaust gas recirculation valve 73, while preventing the engine operating state from being deteriorated by an increase in the opening degree of the exhaust gas recirculation valve 73.

In the valve opening process of the first and second embodiments (step S40, step S120), the second target opening degree DL is set to the maximum opening degree Dmax in the variation range of the opening degree of the exhaust gas recirculation valve 73. Instead, if it is possible to prevent the result of the abnormality diagnosis from being incorrect due to a small opening degree of the exhaust gas recirculation valve 73, the second target opening degree DL may be set to a value less than the maximum opening degree Dmax. That is, even if the actual intake air density is equal to the envisioned lowest density, which is the lowest possible intake air density in a normal operating condition of the diesel engine, the second target opening degree DL may be changed as necessary within a range where the amount of change ΔQ of the intake air amount (required amount of change) that allows an abnormality of the exhaust gas recirculation device 70 to be reliably determined.

In the valve closing process of the illustrated embodiments (step S50, step S130, step S240), the first target opening degree DS is set to the minimum opening degree Dmin in the variation range of the opening degree of the exhaust gas recirculation valve 73. Instead, if it is possible to prevent the result of the abnormality diagnosis from being incorrect due to a small opening degree of the exhaust gas recirculation valve 73, the first target opening degree DS may be changed to a value between the second target opening degree DL and the minimum opening degree Dmin. That is, even if the actual intake air density is equal to the envisioned lowest density during the abnormality diagnosis, the first target opening degree DS may be changed as necessary in a range where the required amount of change in the intake air density can be produced during the abnormality diagnosis of the exhaust gas recirculation device 70.

That is, advantages equivalent to the advantages of the previous embodiments are achieved regardless of the manner in which the second target opening degree DL and the first target opening degree DS are set, as long as the difference between these target opening degrees DL and DS causes the intake amount to change by the above described required amount of change even if the actual intake air density at the diagnosis is the envisioned lowest density.

In the illustrated embodiments, the abnormality diagnosis is executed on condition that the fuel cut-off operation of the diesel engine 1 is being executed. The condition for executing the abnormality diagnosis may be, for example, a condition that the intake air amount is maintained at a constant value. The abnormality diagnosis may be executed when a plurality of conditions are met.

In the illustrated embodiments, it is determined whether there is an abnormality in the exhaust gas recirculation device 70 based on the amount of change ΔQ of the intake air amount due to a decrease in the opening degree of the exhaust gas recirculation valve 73 in the valve closing operation. However, the intake state quantity to be monitored in the abnormality diagnosis is not limited to this. For example, when the opening degree of the exhaust gas recirculation valve 73 decreases in the valve closing operation, it is possible to determine whether there is an abnormality in the exhaust gas recirculation device 70 based on the degree of change in other intake state quantity, for example, the amount of change in the supercharging pressure.

In the illustrated embodiments, the present invention is applied to the abnormality diagnosis device for the exhaust gas recirculation device in the diesel engine 1. However, the present invention may be applied to an abnormality diagnosis device for any type of internal combustion engines including gasoline engines.

The invention claimed is:

1. An abnormality diagnosis device for an exhaust gas recirculation device in an internal combustion engine, the exhaust gas recirculation device having an exhaust gas recirculation valve that adjusts the amount of recirculation exhausts gas returned from an exhaust passage to an intake passage of the engine,
the abnormality diagnosis device comprising a control section that changes the exhaust gas recirculation valve to diagnose an abnormality in the exhaust gas recirculation device, wherein, when an abnormality diagnosis execution condition is met, the control section executes a valve closing operation to reduce the opening degree of the valve to a first target opening degree and monitors a degree of change of a state quantity of intake that changes under the influence of a change in exhaust gas recirculation amount caused by the execution of the valve closing operation, and when the degree of change is less than a determination value, the control section determines that there is an abnormality in the exhaust gas recirculation device, and
wherein, when the abnormality diagnosis execution condition is met, the control section, prior to the execution of the valve closing operation, executes a valve opening process to increase the opening degree of the valve from the opening degree at the time to a second target opening degree greater than the first target opening degree, wherein the first target opening degree and the second target opening degree are predetermined values regardless of the opening degree of the valve at the time when the execution condition is met.

2. The abnormality diagnosis device according to claim 1, wherein the second target opening degree is the greatest opening degree in a variation range of the opening degree of the exhaust gas recirculation valve.

3. The abnormality diagnosis device according to claim 1, wherein the first target opening degree is the smallest opening degree in the variation range of the opening degree of the exhaust gas recirculation valve or an opening degree close to the smallest opening degree.

4. The abnormality diagnosis device according to claim 1, wherein the execution condition includes a condition that fuel cut-off operation of the internal combustion engine is being executed.

5. The abnormality diagnosis device according to claim 1, wherein the execution condition includes a condition that the intake air amount is maintained at a constant value.

6. The abnormality diagnosis device according to claim 1, wherein the intake state quantity includes at least one of the intake air amount and the intake pressure.

7. An abnormality diagnosis device for an exhaust gas recirculation device in an internal combustion engine, the exhaust gas recirculation device having an exhaust gas recirculation valve that adjusts the amount of recirculation exhausts gas returned from an exhaust passage to an intake passage of the engine, wherein the abnormality diagnosis device executes an opening degree adjustment to reduce a target opening degree of the exhaust gas recirculation valve as the density of intake air is lowered,
the abnormality diagnosis device comprising a control section that changes the exhaust gas recirculation valve to diagnose an abnormality in the exhaust gas recirculation device, wherein, when an abnormality diagnosis execution condition is met, the control section executes a valve closing operation to reduce the opening degree of the valve to a first target opening degree and monitors a degree of change of a state quantity of intake that changes under the influence of a change in exhaust gas recirculation amount caused by the execution of the valve closing operation, and when the degree of change is less than a determination value, the control section determines that there is an abnormality in the exhaust gas recirculation device,
wherein, when the abnormality diagnosis execution condition is met, the control section, prior to the execution of the valve closing operation, inhibits the opening degree adjustment and executes a valve opening process to increase the opening degree of the valve from the opening degree at the time to a second target opening degree greater than the first target opening degree, and
wherein the control section sets the second target opening degree based on the density of intake air.

8. The abnormality diagnosis device according to claim 7, wherein the control section reduces the second target opening degree as the density of intake air is lowered.

9. An abnormality diagnosis device for an exhaust gas recirculation device in an internal combustion engine, the exhaust gas recirculation device having an exhaust gas recirculation valve that adjusts the amount of recirculation exhausts gas returned from an exhaust passage to an intake passage of the engine, the abnormality diagnosis device comprising a control section that changes the exhaust gas recirculation valve to diagnose an abnormality in the exhaust gas recirculation device, wherein, when an abnormality diagnosis execution condition is met, the control section executes a valve opening process to increase the opening degree of the valve from the opening degree at the time to a second target opening degree, and thereafter, the control section executes a valve closing operation to reduce the opening degree of the valve to a first target opening degree smaller than the second target opening degree and monitors the degree of change of a state quantity of intake that changes under the influence of a change in exhaust gas recirculation amount caused by the execution of the valve closing operation, wherein, when the degree of change is less than a determination value, the control section determines that there is an abnormality in the exhaust gas recirculation device, and wherein the control section sets the second target opening degree based on the density of intake air.

* * * * *